US011868567B2

(12) United States Patent
Kwon et al.

(10) Patent No.: US 11,868,567 B2
(45) Date of Patent: Jan. 9, 2024

(54) TOUCH RECOGNITION METHOD AND DEVICE HAVING LIDAR SENSOR

(71) Applicant: PIXELSCOPE INC., Seoul (KR)

(72) Inventors: Gee Hwan Kwon, Yongin-si (KR); Kyung Mo Koo, Seoul (KR); Sang Won Lee, Seoul (KR)

(73) Assignee: PIXELSCOPE INC., Seoul (KR)

( * ) Notice: Subject to any disclaimer, the term of this patent is extended or adjusted under 35 U.S.C. 154(b) by 0 days.

(21) Appl. No.: 17/801,043

(22) PCT Filed: Feb. 16, 2021

(86) PCT No.: PCT/KR2021/001945
§ 371 (c)(1),
(2) Date: Aug. 19, 2022

(87) PCT Pub. No.: WO2021/167312
PCT Pub. Date: Aug. 26, 2021

(65) Prior Publication Data
US 2023/0062630 A1    Mar. 2, 2023

(30) Foreign Application Priority Data
Feb. 19, 2020   (KR) .......................... 10-2020-0020301

(51) Int. Cl.
*G06F 3/042*   (2006.01)
(52) U.S. Cl.
CPC .................................. *G06F 3/042* (2013.01)
(58) Field of Classification Search
CPC ........ G06F 3/042; G06F 3/041; G06F 3/0488; G06F 3/0416; G06F 2203/04104; G01S 17/06
See application file for complete search history.

(56) References Cited

U.S. PATENT DOCUMENTS

2018/0286215 A1*  10/2018  Christensen ......... G08B 21/245

FOREIGN PATENT DOCUMENTS

CN          109656457 A      4/2019
KR    10-2009-0006543 A      1/2009
(Continued)

OTHER PUBLICATIONS

Machine translation of KR20110001448 (Year: 2009).*
(Continued)

*Primary Examiner* — Patrick N Edouard
*Assistant Examiner* — Joseph P Fox
(74) *Attorney, Agent, or Firm* — Sughrue Mion, PLLC

(57) ABSTRACT

The present disclosure relates to a touch recognition method and device having a lidar sensor, and an objective of the present disclosure is to recognize a touch and determine the motion of a touch by using the lidar sensor. In order to accomplish the objective, the present disclosure comprises the steps of: (a) extracting, on the basis of sensing information about at least one object sensed through a lidar sensor, coordinates of the object; (b) performing clustering on the coordinates of the object extracted from a first frame so as to calculate a first touch object of the first frame and first coordinates of the first touch object; (c) determining the state of the first touch object by using the first touch object and the first coordinates; (d) converting the first coordinates to real coordinates so as to determine whether the first coordinates are located in a preset effective area; and (e) displaying the first touch object at the real coordinates if it is determined that the first touch object is located in the effective area.

9 Claims, 4 Drawing Sheets

(56) References Cited

FOREIGN PATENT DOCUMENTS

| KR | 20110001448 | * | 10/2009 |
| KR | 10-2011-0057146 A | | 5/2011 |
| KR | 10-2014-0098282 A | | 8/2014 |
| KR | 10-2017-0114045 A | | 10/2017 |

OTHER PUBLICATIONS

Machine translation of KR20140098282 (Year: 2014).*
Machine translation of KR20090006543 (Year: 2009).*
International Search Report for PCT/KR2021/001945 dated Apr. 27, 2021 (PCT/ISA/210).

* cited by examiner

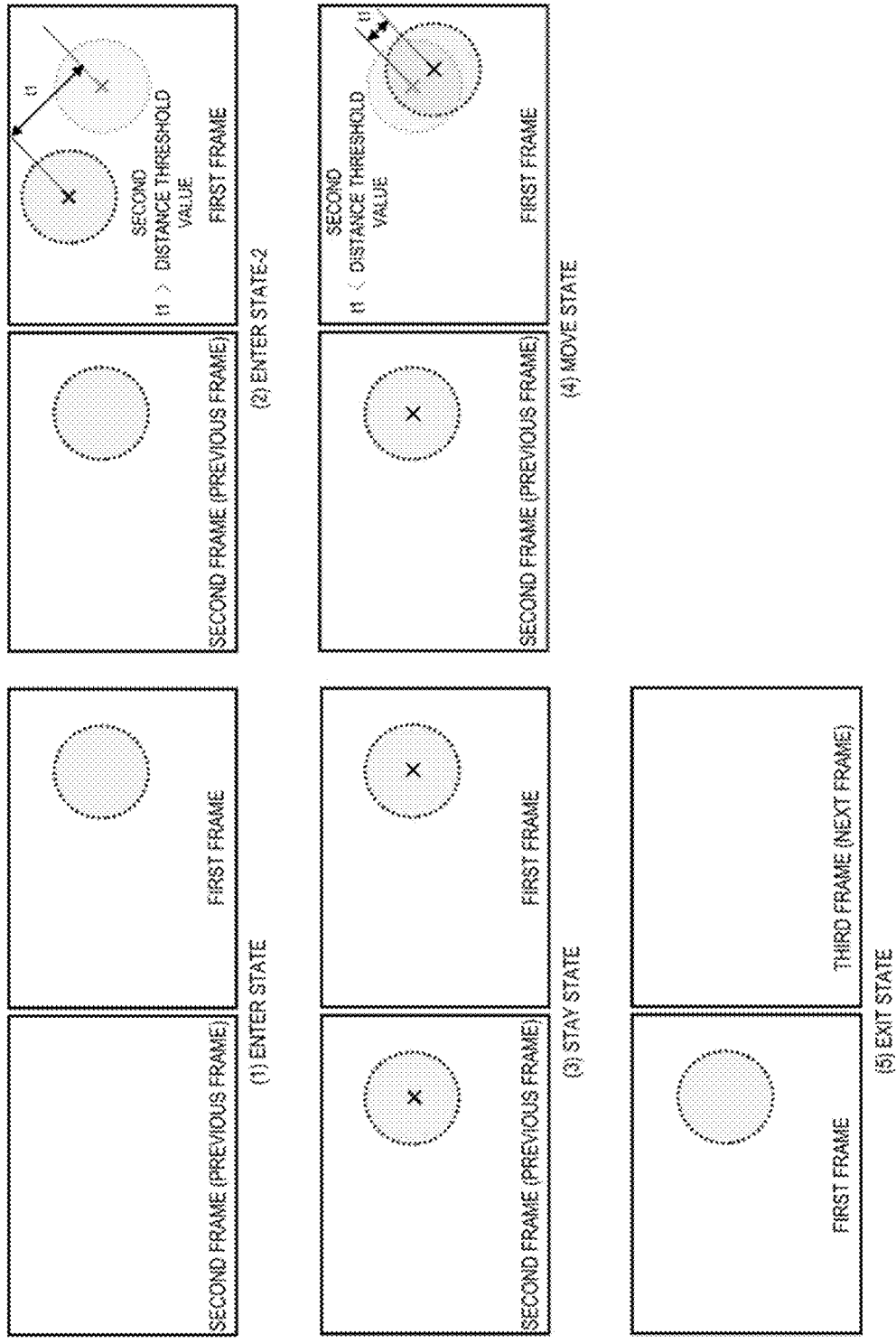

_US 11,868,567 B2_

TOUCH RECOGNITION METHOD AND DEVICE HAVING LIDAR SENSOR

TECHNICAL FIELD

The present disclosure relates to a touch recognition method and device having a LiDAR sensor, more specifically, to a method and device for recognizing a touch object using sensing information collected through a LiDAR sensor.

BACKGROUND ART

Conventionally, in order to recognize motion such as a touch, a method of using a piezoelectric sensor and a method of using 3D image information using a device such as Microsoft's Kinect and Intel's RealSense were mainly used.

The method of using the piezoelectric sensor is similar to that of a DDR pump machine found in a video arcade, and the sensor has to be installed below the location where a touch actually occurs. Therefore, there are problems in that it is difficult to recognize the touch in the vicinity of the sensor and a failure of the sensor due to the touch easily occurs.

On the other hand, the method of using 3D image information can acquire various information such as the location of touch moment, distance of touch moment, etc., but there is a technical difficulty in that it is required to recognize and track a person in an image in order to recognize a touch in the image information.

DISCLOSURE

Technical Problem

The present disclosure is intended to solve the problems described above, and an objective thereof is to recognize a touch using a LiDAR sensor.

In addition, an objective of the present disclosure is to grasp a user's movement by determining the state of a touch object by using sensing information obtained from a LiDAR sensor.

Technical Solution

In order to accomplish the objectives, the present disclosure is characterized by being a method for recognizing a touch of an object by a server, the method comprising the steps of (a) extracting, on the basis of sensing information about at least one object sensed through a LiDAR sensor, coordinates of the object, (b) performing clustering on the coordinates of the object extracted from a first frame so as to calculate a first touch object of the first frame and first coordinates of the first touch object, (c) determining a state of the first touch object by using the first touch object and the first coordinates, (d) converting the first coordinates to real coordinates so as to determine whether the first coordinates are located in a preset effective area, and (e) displaying the first touch object at the real coordinates if it is determined that the first touch object is located in the effective area.

In addition, the present disclosure is characterized by being a device for recognizing a touch of an object, the device comprising a sensor unit that detects at least one object through a LiDAR sensor so as to generate sensing information, a coordinate extraction unit that extracts coordinates of the object on the basis of the sensing information, a data management unit that performs clustering on the coordinates of the object extracted from a first frame so as to extract a first touch object of the first frame and first coordinates of the first touch object, a state determination unit that determines the state of the first touch object by using the first touch object and the first coordinates, a conversion unit that converts the first coordinates to real coordinates so as to determine whether the first touch object is located in a preset effective area, and a display unit that displays the first touch object at the real coordinates if the first touch object is located in the effective area.

Advantageous Effects

According to the present disclosure as described above, a touch can be recognized using the LiDAR sensor, and the touch can be recognized only by installing a small sensor without a large device. Accordingly, a space configuration can be made efficiently.

In addition, the present disclosure can grasp the user's movement by determining the state of the touch object by using the sensing information obtained from the LiDAR sensor.

In addition, the present disclosure can provide a sense of reality to the user who uses content by providing a high accuracy touch recognition technology in technologies related to body motion recognition such as AR and VR content.

DESCRIPTION OF DRAWINGS

FIG. 4 is a diagram for explaining a touch recognition method according to an embodiment of the present disclosure.

MODE FOR INVENTION

Figure 1:
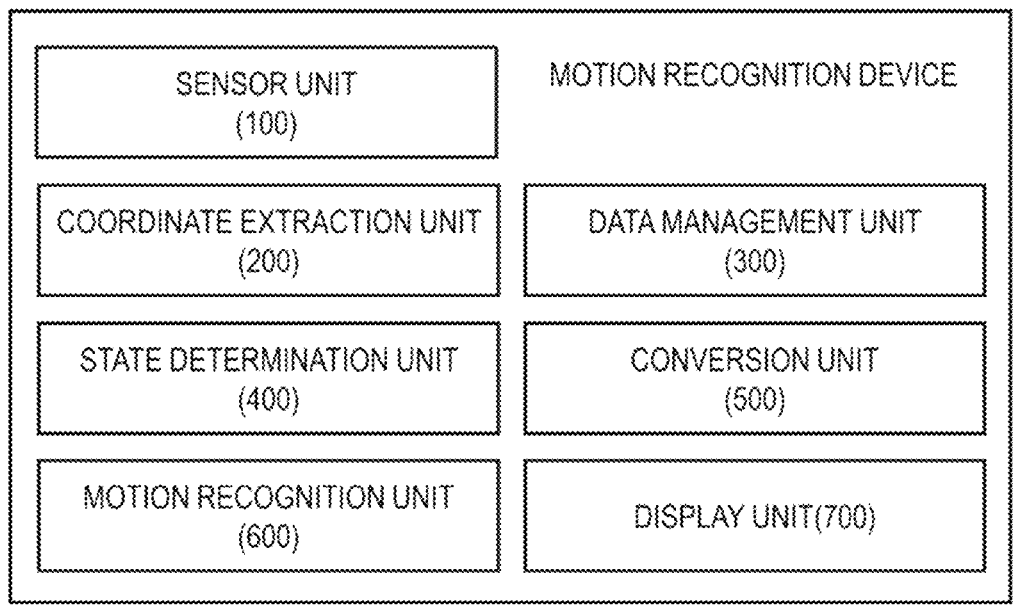
FIG. 1 is a diagram showing a configuration of a touch recognition device according to an embodiment of the present disclosure.

The objects, features, and advantages described above will be described in detail below with reference to the accompanying drawings, and accordingly, those skilled in the art to which the present disclosure pertains will be able to easily implement the technical idea of the present disclosure. In describing the present disclosure, if it is determined that a detailed description of a known technology related to the present disclosure may unnecessarily obscure the gist of the present disclosure, the detailed description thereof will be omitted.

The same reference numerals in the drawings are used to refer to the same or similar constitutional elements, and all combinations thereof described in the specification and claims may be combined in any manner. Unless otherwise specified, it should be understood that a reference to a singular may include one or more, and a reference to a singular expression may also include a plural expression.

The terms used in the present specification have the purpose of describing specific exemplary embodiments only and are not intended to be limiting. Singular expressions as used herein may also be intended to include plural meanings unless clearly indicated differently in the corresponding sentence. The terms "and/or" include all combinations of items listed in association therewith and any one of them. The terms "includes", "comprises", "comprising", "provided with", "having", etc. have an implicit meaning, and accordingly, these terms specify the features, integers, steps, actions, elements, and/or components described and do not preclude the presence or addition of one or more other features, integers, steps, actions, elements, components, and/or groups thereof. The steps, processes, and actions of the method described herein should not be construed as necessarily performing their performance in such a specific order discussed or illustrated, unless the order of performance thereof is specifically determined. It should also be understood that additional or alternative steps may be used.

In addition, each of the constitutional elements may be implemented as a hardware processor, the above constitutional elements may be integrated and implemented as a single hardware processor, or the above constitutional elements may be combined with each other and implemented as a plurality of hardware processors.

Hereinafter, preferred embodiments according to the present disclosure will be described in detail with reference to the accompanying drawings.

FIG. 1 is a schematic configuration diagram of a touch recognition device according to an embodiment of the present disclosure. Referring to FIG. 1, the touch recognition device may include a sensor unit 100, a coordinate extraction unit 200, a data management unit 300, a state determination unit 400, a conversion unit 500, a motion recognition unit 600, and a display unit 700.

The sensor unit 100 may detect at least one object through a LiDAR sensor so as to generate sensing information for each object. A LiDAR sensor is a technology that calculates a distance based on the time it takes for light to return by recognizing light reflecting back from an object after emitting light. The LiDAR sensor is being used in various fields such as autonomous vehicle driving field, construction field, and aerial survey field. The LiDAR sensor may acquire relatively accurate distance information compared to other distance sensors.

The sensing information generated through the sensor unit 100 may include at least one of a distance to an object, a direction, a speed, a temperature, a material distribution and concentration characteristic, or 3D image information.

The sensor unit 100 may recognize a motion of a user touching a floor in a sensable area by sensing the floor at a distance of about 4.6 mat an angle of 180 degrees forward. The sensable area may depend on the performance of the LiDAR sensor used.

The coordinate extraction unit 200 may extract coordinates of the object based on sensing information for all frames received from the sensor unit 100. The coordinate extraction unit 200 will extract coordinates only for a recognized touch object within a preset angle range.

The coordinate extraction unit 200 may extract the coordinates of the object by using the distance and direction included in the sensing information. The coordinates of the object extracted by the coordinate extraction unit 200 mean not coordinates corresponding to a real area, but coordinates corresponding to a two-dimensional distance map having the location where the sensor unit 100 is installed as the origin.

The coordinate extraction unit 200 may display the object for each frame in a planar coordinate system, that is the two-dimensional distance map, according to the coordinates. The coordinate extraction unit 200 may display an object included in a first frame at corresponding coordinates of a first planar coordinate system, and may display an object included in a second frame at corresponding coordinates of a second planar coordinate system. As such, the coordinate extraction unit 200 will allocate the planar coordinate system for each frame.

The data management unit 300 may perform clustering on at least one object displayed in the planar coordinate system so as to extract a touch object and coordinates thereof from each frame. The data management unit 300 may extract a first touch object of the first frame and first coordinates of the first touch object by using the planar coordinate system in which objects belonging to the first frame are displayed.

The data management unit 300 calculates a first distance between coordinates of the object extracted from the first frame so as to perform clustering to form a cluster according to the distance. The data management unit 300 sets the cluster, generated by performing clustering by comparing the first distance with a preset first distance threshold, as the first touch object.

Figure 2:
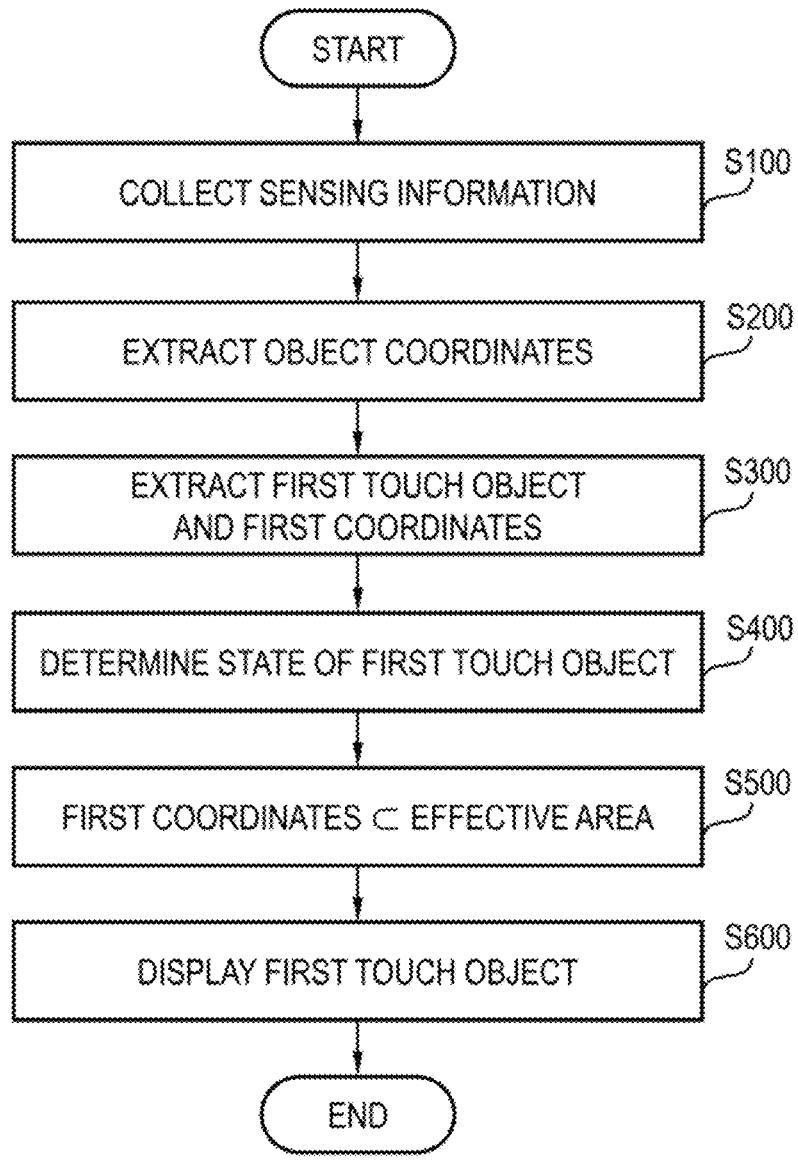
FIG. 2 is a diagram for explaining a method for recognizing a touch object according to an embodiment of the present disclosure.
Figure 3:
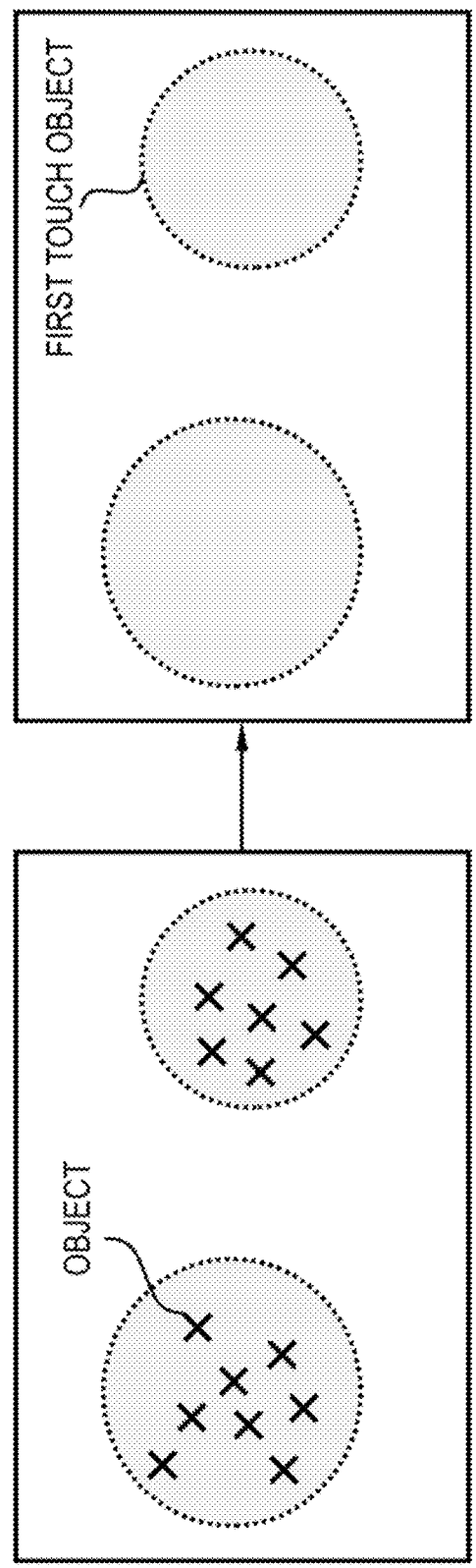
FIG. 3 is a diagram for explaining the state of the touch object according to an embodiment of the present disclosure.

Referring to FIG. 2, the data management unit 300 may regard at least one object included in the cluster, in which the distance between the objects extracted from the first frame is less than or equal to a first distance threshold value, as the first touch object. If there are a plurality of clusters in the first frame, the data management unit 300 may also set a plurality of first touch objects. The data management unit 300 may form at least one cluster in the first frame with the coordinates according to the sensing information as a reference.

When the data management unit 300 sets the first touch object, the data management unit 300 will extract the first coordinates of the first touch object. In this case, the first coordinates may be a point or an area. In this case, a touch object list may include the first touch object, the first coordinates of the first touch object, and the number of objects belonging to the first touch object.

Meanwhile, the data management unit 300 determines noise in the first touch object included in the touch object list by using the number of objects included in the first touch object. The data management unit 300 may determine the first touch object as noise if the number of objects included in the first touch object is less than a predetermined level. In this case, the predetermined level may be different according to the setting of an administrator. The data management unit 300 will remove the first touch object determined as noise from the touch object list.

A process of removing the first touch object determined as noise from the touch object list may be performed before or after adding information about the first touch object to the touch object list.

The state determination unit 400 will determine the state of the first touch object by using the first touch object of the first frame and the first coordinates, which included in the touch object list and extracted from the data management unit 300. Referring to FIG. 4, in order to determine the state of the first touch object, the state determination unit 400 may consider a second frame that is a previous frame continuous with the first frame and a third frame that is a next frame continuous with the first frame.

The state determination unit 400 will check whether a second touch object exists in the second frame. According to (1) of FIG. 4, if the second touch object does not exist in the second frame, the state determination unit 400 may determine the first touch object as an enter state. This means that a new touch object is sensed with no sensing information in the previous frame, and the new touch object is recognized. The enter state is similar to the state of pressing the mouse button.

If the second touch object exists in the second frame, the state determination unit 400 may calculate a second distance between the first coordinates and second coordinates of the second touch object in the second frame. According to (2) of FIG. 4, the state determination unit 400 may compare the second distance with a preset second distance threshold value, and determine the first touch object as the enter state if the second distance is greater than the second distance threshold value. Since the first touch object is located in a different area from the second touch object, the state determination unit 400 may determine that a new touch object is recognized.

According to (3) of FIG. 4, if the first coordinate and the second coordinate are the same, the state determination unit 400 may determine the first touch object as a stay state. The stay state may provide information that a touch object for which sensing information is already present continues to exist.

According to (4) of FIG. 4, if the first coordinates and the second coordinates are not the same and the second distance is less than the second distance threshold, the state determination unit 400 may determine the first touch object as a move state.

This means that, although sensing information exists in the second frame, sensing is made at a different location and not at the same location in the first frame, and that the touch object has moved. The move state is similar to the state of dragging the mouse button.

According to (5) of FIG. 4, if a third touch object does not exist in the third frame, the state determination unit 400 may determine the first touch object as an exit state. This means that the first touch object no longer exists in the third frame, and the exit state is similar to the state of releasing the mouse button.

Although not separately shown in FIG. 4, if the third touch object exists in the third frame, the state determination unit 400 may calculate a third distance between the first coordinates and third coordinates of the third touch object in the third frame. The state determination unit 400 may compare the third distance with a preset second distance threshold value and determine the first touch object as an exit state if the third distance is greater than the second distance threshold value. Since the first touch object and the third touch object are located in different areas, the state determination unit 400 may determine that the first touch object disappeared and a new third touch object is recognized.

If the third distance is less than the second distance threshold value, the state determination unit 400 may determine the first touch object as a stay state or a move state.

In determining the first touch object, the state determination unit 400 may determine the state of the first touch object in consideration of the number of various cases as at least one touch object exists for each frame.

The conversion unit 500 may convert the first coordinates into real coordinates so as to determine whether the first touch object is located in a preset effective area. The effective area may be an entire sensing area or an area obtained by dividing the entire sensing area. In the touch recognition method according to an embodiment of the present disclosure, by setting the effective area, it may be checked whether the touch object enters a specific area or whether the touch object is recognized at a specific location.

The motion recognition unit 600 may grasp the movement of the touch object located in the effective area. The motion recognition unit 600 may measure the speed of a user's footsteps based on the touch object located in the effective area or measure the motion of moving in an area sequentially or the time spent in a specific area by analyzing information of the touch object recognized in the effective area. The motion recognition unit 600 will use the real coordinates of the touch object and the time at which the touch object is recognized in order to grasp the movement of the touch object described above.

For example, if a touch object is first recognized at 12:24:31.44 in the effective area and last recognized at 12:25:41.53, the motion recognition unit 600 will determine that the recognized touch object stayed in the effective area for 1 minute and 10.09 seconds.

The motion recognition unit 600 may measure a touch count such as a jump within the effective area. The motion recognition unit 600 may measure the number of jumps by determining that the user is jumping if the first touch object repeatedly appears at the same first coordinates in several consecutive frames.

The motion recognition unit 600 may track a user movement by using the first recognized touch object, the last recognized touch object, and a touch object existing therebetween in the effective area. In addition, the motion recognition unit 600 may also track a motion of lifting or dragging an object located at a specific location.

According to another embodiment of the present disclosure, the touch recognition device may further include a camera module including a depth camera and/or a 3D camera to simultaneously photograph the same area together with the sensor unit 100. The motion recognition unit 600 may grasp not only the movement of the touch object, but also the user's entire movement from an image photographed by the camera module. Since only the motion of touching the floor can be grasped from the movement of the touch object, the present disclosure can obtain information on how the user is moving his or her body by further including the camera module.

The display unit 700 may display the touch object for the effective area. In this case, a beam projector may be used as the display unit 700 so that a screen on which the touch object is displayed can be displayed at a location corresponding to the real coordinates, that is, in the effective area of the sensor.

The display unit 700 may induce the user to touch the target location by not only displaying the touch object, but also displaying a target location where the touch object should be located. In this case, the target location will be displayed differently according to the user's body information.

When the entire sensing area is divided into a specific number of areas and used, the display unit 700 may induce the user to multi-touch by setting the same effective area in each area. In addition, the display unit 700 may induce the user to touch a specific section reciprocally.

As such, the display unit 700 may induce the user's movement by displaying the target location. Due to these characteristics, the touch recognition device of the present disclosure may be used to guide an appropriate exercise posture to the user. The user may correct the exercise posture by checking the target location displayed on the display unit 700 and touching the target location with his or her hand and/or foot.

Hereinafter, the touch recognition method will be described with reference to FIG. 2. In the description of the touch recognition method, a detailed embodiment overlapping with the touch recognition device described above may be omitted. The touch recognition device may be implemented as a server, and hereinafter, it is referred to as a server.

In step 100, the server may detect at least one object from the LiDAR sensor so as to generate sensing information for each object. The sensing information may include at least one of a distance from the sensor to the object, a direction, a speed, a temperature, a material distribution and concentration characteristic, or 3D image information. The LiDAR sensor may recognize a motion of the user touching the floor by sensing the floor.

In step 200, the server may extract the coordinates of the object based on all sensing information collected from the LiDAR sensor. The server may extract coordinates only for the touch object recognized within the preset angle range. More specifically, the server may extract the coordinates of the object by using the distance and direction included in the sensing information. In this case, the coordinates of the object mean coordinates corresponding to a two-dimensional distance map having the location where the sensor is installed as the origin. The server may display the extracted coordinates of the object in a planar coordinate system.

In step 300, the server may perform clustering on at least one object displayed in the planar coordinate system so as to extract the first touch object of the first frame and the first coordinates of the first touch object. The server calculates a first distance between coordinates of each object in the planar coordinate system in which the objects for the first frame is displayed so as to perform clustering to form a cluster according to the distance.

The server may regard at least one object included in the cluster, in which the first distance is equal to or less than the first distance threshold, as the first touch object. In this case, if a plurality of clusters are formed in the first frame, a plurality of first touch objects may also be formed. In this case, sensing information of an object not included in the first touch object will be deleted.

If the server sets the first touch object, the server may extract the first coordinates of the first touch object. In this case, the first coordinates may be a point or an area.

In step 400, the server will determine the state of the first touch object by using the first touch object and the first coordinates thereof. In order to determine the state of the first touch object, the server may consider a previous frame (second frame) and a next frame (third frame) that are continuous with the first frame.

In the process of determining the state of the first touch object by the server, (1) If the second touch object does not exist in the second frame and the first touch object exists in the first frame, the server may determine the first touch object as an enter state.

(2) If the second touch object exists in the second frame and the first touch object exists in the first frame, the server may calculate a second distance between the first coordinates and the second coordinates of the second touch object. In this case, if the second distance is greater than the second distance threshold value, the server may determine the first touch object as an enter state.

(3) If the second distance is less than the second distance threshold value and the first coordinates and the second coordinates are the same, the server may determine the first touch object as a stay state, and if the first coordinates and the second coordinates are not the same, the server may determine the first touch object as a move state.

(4) If the first touch object exists in the first frame and the third touch object does not exist in the third frame, the server may determine the first touch object as an exit state.

(5) If the first touch object exists in the first frame and the third touch object exists in the third frame, the server may calculate a third distance between the first coordinates and the third coordinates of the third touch object. In this case, if the third distance is greater than the third distance threshold value, the server may determine the first touch object as the exit state, otherwise the server may determine the first touch object as the stay state or the move state.

In step 500, it may be determined, by converting the first coordinates into real coordinates, whether the first touch object exists within the preset effective area. The effective area may be the entire sensing area or an area obtained by dividing the entire sensing area.

In step 600, if the first touch object exists within the effective area, the server will display the first touch object on the display unit. A beam projector may be used as the display unit such that a screen on which the touch object is displayed can be displayed at a position corresponding to real coordinates, that is, at a position corresponding to a sensing region.

The embodiments of the present disclosure disclosed in the present specification and drawings are merely provided for specific examples in order to easily explain the technical contents of the present disclosure and help the understanding of the present disclosure, and are not intended to limit the scope of the present disclosure. It will be obvious to those of ordinary skill in the art to which the present disclosure pertains that other modifications based on the technical spirit of the present disclosure can be implemented in addition to the embodiments disclosed herein.

The invention claimed is:

1. A method for recognizing a touch of an object by a server, the method comprising the steps of:
   (a) extracting, on the basis of sensing information about a plurality of objects sensed through a LiDAR sensor, coordinates of the plurality of objects for a plurality of frames including a first frame and a second frame that is a previous frame continuous with the first frame;
   (b) performing clustering on coordinates of a plurality of first objects extracted from the first frame to set a first touch object of the first frame and calculate first coordinates of the first touch object, wherein the first touch object corresponds to a first cluster including a number of first objects among the plurality of first objects;
   (c) determining a state of the first touch object by using the first touch object and the first coordinates;
   (d) converting the first coordinates to real coordinates to determine whether the first coordinates are located in a preset effective area; and
   (e) displaying the first touch object at the real coordinates if it is determined that the first touch object is located in the effective area,
   wherein the step (c) comprises:
   determining whether a second touch object exists in the second frame that is the previous frame continuous with the first frame,
   based on the second touch object not existing in the second frame, determining the state of the first touch object as a first enter state, wherein the first enter state indicates that no sensing information is in the second frame and a new touch object is recognized in the first frame, based on the second touch object existing in the second frame, calculating a second distance between the first coordinates in the first frame and second coordinates of the second touch object in the second frame, and comparing the second distance with a preset second distance threshold value, based on the second distance being greater than the second distance threshold value, determining the state of the first touch object as a second enter state, wherein the second enter state indicates that the first touch object is located in a different area from the second touch object and a new touch object corresponding to the first touch object is recognized, based on the first coordinates and the second coordinates being the same with each other, determining the state of the first touch object as a stay state, wherein the stay state indicates that a touch object for which sensing information is present continues to exist on a same area, based on the first coordinates and the second coordinates not being the same with each other and the second distance being less than the second distance threshold value, determining the state of the first touch object as a move state, wherein the move state indicates that the first touch object has moved from an area on which the second touch object is located to an area on which the first touch object is located.

2. The method according to claim 1, wherein the step of (a) comprises a step of displaying the coordinates of the plurality of objects in a planar coordinate system for each frame of the plurality of frames, the coordinates of the plurality of objects being two-dimensional coordinates.

3. The method according to claim 1, wherein the step of (b) further comprises the steps of:
calculating a first distance between coordinates of the plurality of first objects displayed in a planar coordinate system corresponding to the first frame;
performing clustering by comparing the first distance with a preset first distance threshold value; and
setting the first cluster generated by performing clustering as the first touch object.

4. The method according to claim 1, further comprising the steps of:
generating a touch object list by using the first touch object, the first coordinates of the first touch object, and the number of the plurality of first objects included in the first touch object; and
removing the first touch object from the touch object list based on the number of the plurality of first objects being equal to or less than a preset number, wherein a distance among the plurality of first objects is less than a preset first distance threshold value.

5. The method according to claim 1, wherein the plurality of frames include a third frame that is a next frame continuous with the first frame, and
wherein the step of (c) comprises:
determining whether a third touch object exists in the third frame that is the next frame continuous with the first frame;
based on the third touch object not existing in the third frame, determining the state of the first touch object as an exit state, wherein the exit state indicates that the first touch object no longer exists in the third frame,
based on the third touch object existing in the third frame, calculating a third distance between the first coordinates of the first touch object and third coordinates of the third touch object; and determining the state of the first touch object by comparing the third distance with a preset third threshold value.

6. A device for recognizing a touch of an object, the device comprising:
a sensor unit that detects a plurality of objects for a plurality of frames through a LiDAR sensor to generate sensing information, the plurality of frames including a first frame and a second frame that is a previous frame continuous with the first frame;
a display unit;
a processor;
a memory storing instructions executable by the processor;
wherein the processor is configured to:
extract coordinates of the plurality of objects on the basis of the sensing information;
perform clustering on coordinates of a plurality of first objects extracted from a first frame to set a first touch object of the first frame and calculate first coordinates of the first touch object, wherein the first touch object corresponds to a first cluster including a number of first objects among the plurality of first objects;
determine a state of the first touch object by using the first touch object and the first coordinates;
convert the first coordinates to real coordinates to determine whether the first touch object is located in a preset effective area; and
control the display unit to display the first touch object at the real coordinates if the first touch object is located in the effective area,
wherein the processor is further configure to:
determine whether a second touch object exists in the second frame that is the previous frame continuous with the first frame,
based on the second touch object not existing in the second frame, determine the state of the first touch object as a first enter state, wherein the first enter state indicates that no sensing information is in the second frame and a new touch object is recognized in the first frame,
based on the second touch object existing in the second frame, calculate a second distance between the first coordinates in the first frame and second coordinates of the second touch object in the second frame, compare the second distance with a preset second distance threshold value,
based on the second distance being greater than the second distance threshold value, determine the state of the first touch object as a second enter state, wherein the second enter state indicates that the first touch object is located in a different area from the second touch object and a new touch object corresponding to the first touch object is recognized,
based on the first coordinates and the second coordinates being the same with each other, determine the state of the first touch object as a stay state, wherein the stay state indicates that a touch object for which sensing information is present continues to exist on a same area,
based on the first coordinates and the second coordinates not being the same with each other and the second distance being less than the second distance threshold value, determine the state of the first touch object as a move state, wherein the move state indicates that the first touch object has moved from an area on which the second touch object is located to an area on which the first touch object is located.

7. The device according to claim 6, wherein the processor is further configured to:
calculate a first distance between the coordinates of the plurality of first objects included in the first frame, perform clustering by comparing the first distance with a preset first distance threshold value, and set the first cluster as the first touch object.

8. The device according to claim 6, wherein the plurality of frames include a third frame that is a next frame continuous with the first frame, and
wherein the processor is further configured to:
determine whether a third touch object exists in the third frame that is the next frame continuous with the first frame,
based on the third touch object not existing in the third frame, determine the first touch object as an exit state, wherein the exit state indicates that the first touch object no longer exists in the third frame, and
based on the third touch object existing in the third frame, calculate a third distance between the first coordinates of the first touch object and third coordinates of the third touch object, and
determine the state of the first touch object by comparing the third distance with a third distance threshold value.

9. The device according to claim 6, wherein the processor is further configured to:
generate a touch object list by using the first touch object, the first coordinates of the first touch object, and the number of the plurality of first objects included in the first touch object; and
remove the first touch object from the touch object list based on the number of the plurality of first objects being equal to or less than a preset number,
wherein a distance among the plurality of first objects is less than a preset first distance threshold value.

* * * * *